United States Patent
Endo et al.

(10) Patent No.: US 7,275,617 B2
(45) Date of Patent: Oct. 2, 2007

(54) STEERING CONTROL DEVICE

(75) Inventors: Masaya Endo, Tokyo (JP); Masahiko Kurishige, Tokyo (JP); Toshihide Satake, Tokyo (JP); Noriyuki Inoue, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/529,038

(22) PCT Filed: Apr. 21, 2004

(86) PCT No.: PCT/JP2004/005709

§ 371 (c)(1),
(2), (4) Date: Mar. 24, 2005

(87) PCT Pub. No.: WO2004/101346

PCT Pub. Date: Nov. 25, 2004

(65) Prior Publication Data

US 2006/0042860 A1 Mar. 2, 2006

(30) Foreign Application Priority Data

May 16, 2003 (JP) .............................. 2003-139371

(51) Int. Cl.
*B62D 5/04* (2006.01)
*B62D 6/08* (2006.01)

(52) U.S. Cl. ...................... 180/402; 180/446; 180/444; 180/442; 701/41; 701/42

(58) Field of Classification Search ................. 180/442
See application file for complete search history.

(56) References Cited

U.S. PATENT DOCUMENTS

| | | | |
|---|---|---|---|
| 5,904,223 A | 5/1999 | Shimizu et al. | |
| 6,079,513 A | 6/2000 | Nishizaki et al. | |
| 6,219,604 B1 | 4/2001 | Dilger et al. | |
| 6,239,568 B1 | 5/2001 | Sugitani et al. | |
| 6,389,342 B1 * | 5/2002 | Kanda ......................... | 701/41 |
| 6,450,287 B1 | 9/2002 | Kurishige et al. | |
| 6,481,526 B1 * | 11/2002 | Millsap et al. .............. | 180/402 |
| 6,580,989 B1 * | 6/2003 | Daugherty et al. ........... | 701/41 |
| 6,736,236 B2 | 5/2004 | Kurishige et al. | |
| 6,763,908 B2 * | 7/2004 | Ogawa et al. .............. | 180/446 |
| 6,768,283 B2 | 7/2004 | Tanaka et al. | |
| 6,886,656 B2 * | 5/2005 | Fujioka et al. .............. | 180/402 |
| 2004/0040781 A1 | 3/2004 | Fujioka et al. | |

FOREIGN PATENT DOCUMENTS

| | | |
|---|---|---|
| DE | 100 52 559 A1 | 4/2002 |
| EP | 1 243 496 A2 | 9/2002 |
| JP | 2000-128002 | 5/2000 |
| JP | 2000-238654 | 9/2000 |
| JP | 2002-019631 | 1/2002 |
| JP | 2002-274405 | 9/2002 |
| JP | 2002-370658 | 12/2002 |
| JP | 2003-118620 | 4/2003 |
| JP | 2004-168150 | 6/2004 |
| JP | 2004-196069 | 7/2004 |

* cited by examiner

*Primary Examiner*—Lesley D. Morris
*Assistant Examiner*—Marlon Arce-Diaz
(74) *Attorney, Agent, or Firm*—Leydig, Voit & Mayer, Ltd.

(57) ABSTRACT

In an electrical power steering apparatus, steering shaft reaction torque is estimated by a steering shaft reaction torque estimation unit, and a reference road reaction torque is estimated by a reference road reaction torque estimation unit. The estimated steering shaft reaction torque and the reference road reaction torque are weighted, and, in response, a target steering reaction torque is set by a target steering reaction torque generation unit, hysteresis width and slope of the target steering reaction torque are respectively adjusted, and steering feeling is thereby easily improved.

5 Claims, 10 Drawing Sheets

STEERING CONTROL DEVICE

TECHNICAL FIELD

The present invention relates to a steering control apparatus in which the hysteresis width and slope of a target steering reaction torque are adjusted to improve steering feeling.

BACKGROUND ART

In a conventional steering control apparatus disclosed in JP-A-2000-238654, a steering reaction torque is determined by the following.

steering reaction torque=$K$·tire reaction torque+correction value

Where, the correction value is set from a vehicle speed and a steering angle.

By this, a steering reaction torque characteristic (steering angle—steering reaction torque characteristic) with a suitable hysteresis is realized.

Besides, in a convention steering control apparatus disclosed in JP-A-2002-274405, a steering reaction torque is determined by the following. By that, in a separate type power steering apparatus in which mechanical coupling is not performed, a steering feeling comparable to that of a vehicle equipped with a conventional power steering apparatus is realized.

steering reaction torque The=$(1+f(o))^{-1}$SAT

SAT: Self Aligning Torque f(o): assist torque Tem=f(o) The

Besides, in a conventional steering control apparatus disclosed in JP-A-2002-19631, a steering reaction torque with a hysteresis is generated by a turning increase/turning back judgment means and a previously set relational expression between a steering wheel angle and a steering reaction torque.

In the conventional steering control apparatus disclosed in JP-A-2000-238654, although the hysteresis and the slope of the steering reaction torque can be adjusted by [steering reaction torque=K·tire reaction torque+correction value], it is necessary to previously set the correction value, and there is a case where a suitable correction value is not obtained according to a change in road surface friction μ or the like.

Further, in the conventional steer-by-wire disclosed in JP-A-2002-274405, since the steering reaction torque is set from the relation of the assist map of the power steering and the estimated self-aligning torque, the steering feeling comparable to the vehicle equipped with the power steering system can be obtained, however, it is not easy to freely set the hysteresis width and the slope of the steering reaction torque so as to improve the steering feeling more than the vehicle equipped with the conventional power steering apparatus.

Besides, in the conventional steering control apparatus disclosed in JP-A-2002-19631, since it is necessary to previously set the relational expression between the steering wheel angle and the steering reaction torque, in order to set a complicated steering reaction torque, the number of matching steps is increased, and the computation processing becomes complicated. Further, an external force exerted on a wheel is changed by a road surface friction coefficient, a steering state, and the like. According to the steering reaction torque mathematically obtained from the steering angle and the vehicle speed, it is impossible to perform a control to obtain a steering reaction torque in which the external force exerted on the wheel and friction inherent in the steering apparatus are sufficiently taken into consideration, and therefore, there is a problem that the behavior of a vehicle can not be recognized, and there is a, fear that the steering feeling is degraded.

DISCLOSURE OF THE INVENTION

The present invention has been made to solve the problems as described above, and has an object to provide a steering control apparatus in which a hysteresis width and a slope of a target steering reaction torque are respectively adjusted, so that a target steering reaction torque to improve a steering feeling can be easily obtained, and a suitable steering reaction torque can be obtained even if road surface friction is changed.

A steering control apparatus of the invention includes target steering reaction torque generation means for generating a target steering reaction torque as a target value of a steering reaction torque applied to a steering wheel, and performs a control so that the steering reaction torque is coincident with the target steering reaction torque, in which the target steering reaction torque generation means includes steering shaft reaction torque estimation means for estimating a steering shaft reaction torque, and reference road reaction torque estimation means for estimating a reference road reaction torque, and uses the steering shaft reaction torque estimated by the steering shaft reaction torque estimation means and the reference road reaction torque estimated by the reference road reaction torque estimation means to set the target steering reaction torque. Accordingly, the behavior of a vehicle at the time of running can be transmitted to the driver, and a natural steering feeling can be obtained, and further, since the hysteresis width and the slope of the target steering reaction torque can be respectively adjusted, the suitable target steering reaction torque to improve the steering feeling can be easily set.

BEST MODE FOR CARRYING OUT THE INVENTION

EMBODIMENT 1

Figure 1:
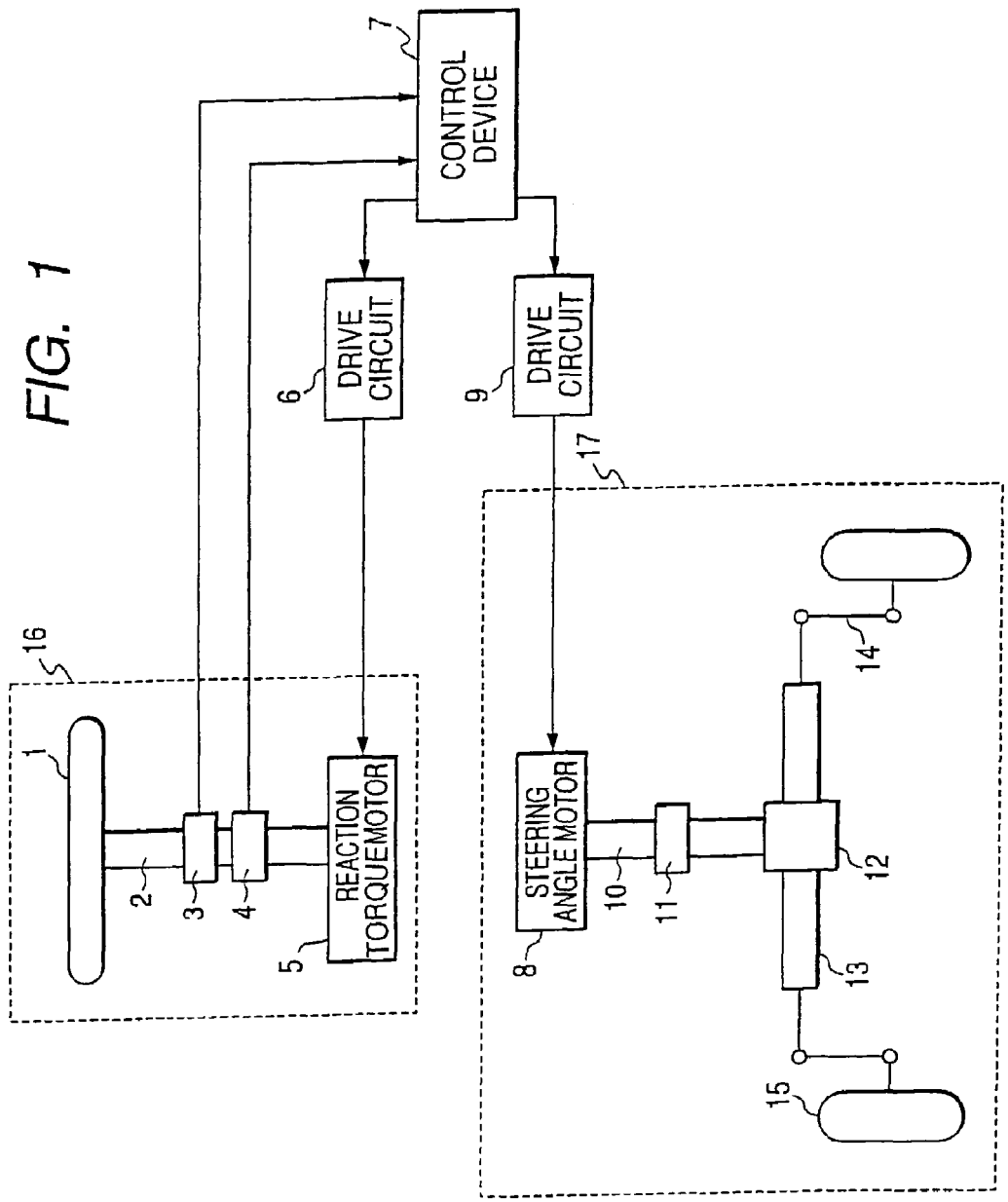
FIG. 1 is a view showing an outline of a structure of a steering control apparatus according to embodiment 1 of this invention.

FIG. 1 is a view showing an outline of a structure of a steering control apparatus according to embodiment 1 of this invention.

FIG. 1 shows a so-called steer-by-wire system steering control apparatus in which a steering mechanism 16 by which a driver operates a steering wheel 1 is not mechanically coupled to a wheel turning mechanism 17 for turning a wheel 15. The steering mechanism 16 includes steering wheel angle detection means 3 for detecting a steering angle of the steering wheel 1 through a steering wheel shaft 2, steering reaction torque detection means 4 for detecting a steering reaction torque applied to the steering wheel, and a reaction torque motor 5 for arbitrarily controlling this steering reaction torque. The wheel turning mechanism 17 includes wheel steering angle detection means 11 for detecting an angle corresponding to a wheel steering angle of the steered wheel, and a steering angle motor 8 for arbitrarily controlling the wheel steering angle. A rotation angle of a steering shaft 10 controlled by the steering angle motor 8 is converted into the wheel steering angle of the wheel 15 through a pinion gear 12, a rack 13, and a knuckle arm 14.

A control device 7 includes steering shaft reaction torque estimation means for estimating a steering shaft reaction torque as the sum of a steering shaft converted value of a reaction force acting on the wheel at the time of turning the wheel and a steering shaft converted value of a friction torque acting on the wheel turning mechanism, and reference road reaction torque estimation means for estimating a reference road reaction torque as the steering shaft converted value of the reaction torque acting on the wheel at the time of turning the wheel, and further includes target steering reaction torque generation means for generating a target value of a steering reaction torque to be applied to the steering wheel from the estimated steering shaft reaction torque and the reference road reaction torque, steering reaction torque control means for setting a target current value for driving the reaction torque motor so that the target steering reaction torque is coincident with the steering reaction torque detected by the steering reaction torque detection means 4, target wheel steering angle generation means for generating a target wheel steering angle of the steered wheel, and wheel steering angle control means for setting a target current value for driving the steering angle motor so that the target wheel steering angle is coincident with the output of the wheel steering angle detection means 11.

A drive circuit 6 controls a drive current so that the target current set by the reaction torque control means is applied to the reaction torque motor. A drive circuit 9 controls a drive current so that the target current set by the wheel steering angle control means is applied to the steering angle motor.

Figure 2:
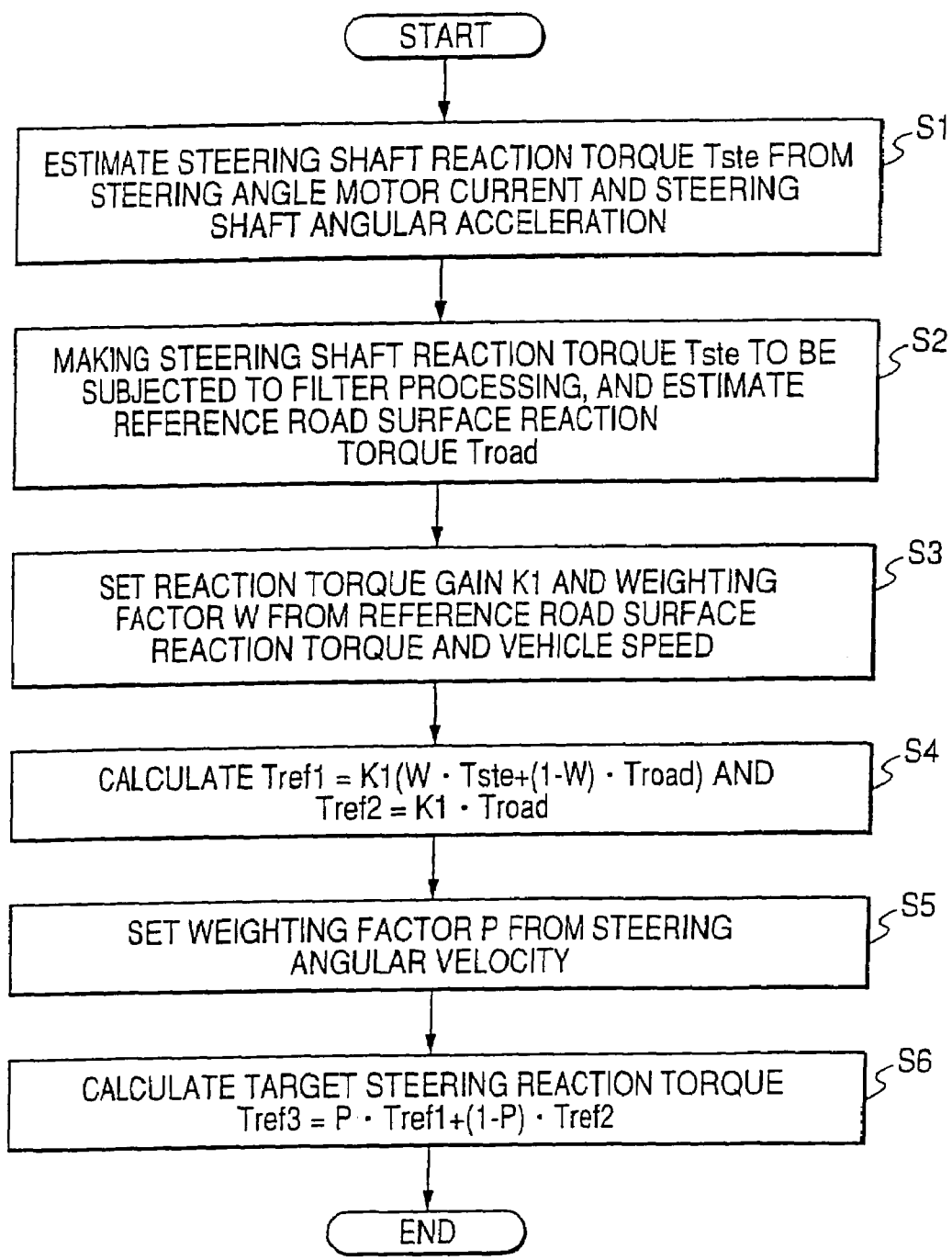
FIG. 2 is a flowchart showing target steering reaction torque generation means of the steering control apparatus according to embodiment 1 of this invention.

FIG. 2 is a flowchart showing the target steering reaction torque generation means of the steering control apparatus according to embodiment 1 of this invention.

Figure 3:
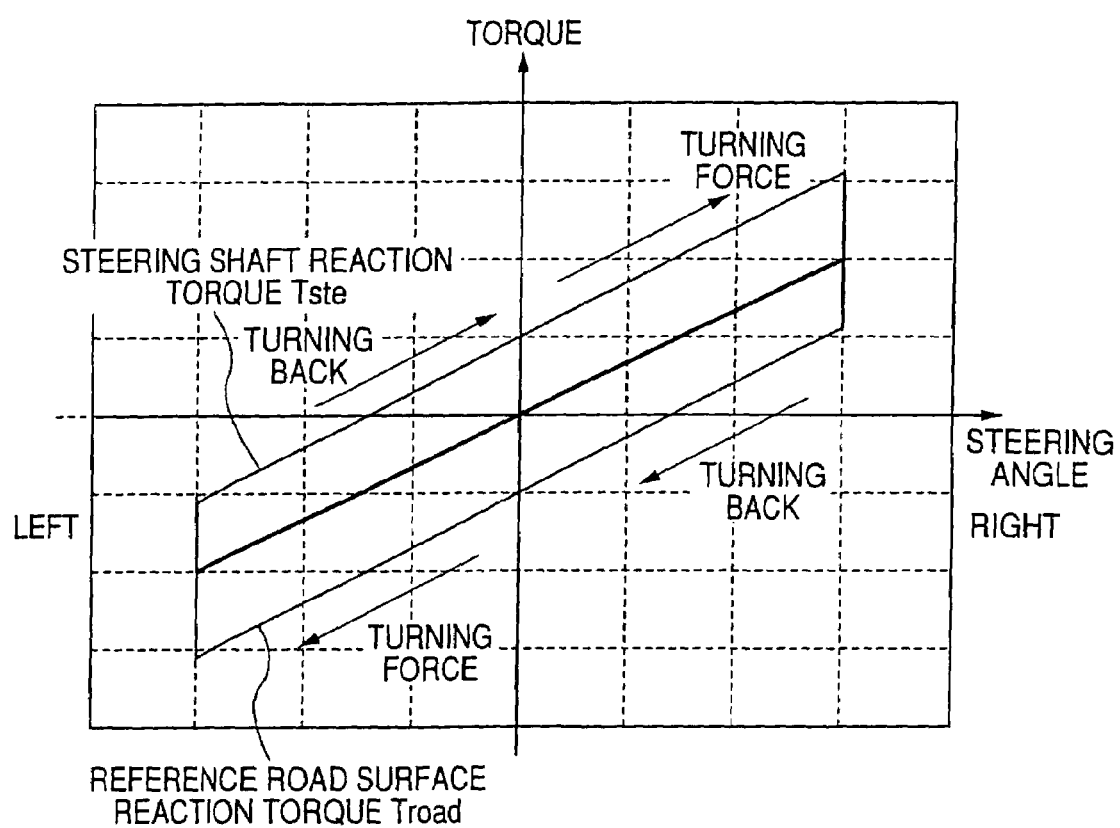
FIG. 3 is a view showing a relation between a steering shaft reaction torque Tste of the steering control apparatus according to embodiment 1 of this invention and a reference road reaction torque Troad.

FIG. 3 is a view showing a relation between the steering shaft reaction torque Tste of the steering control apparatus according to embodiment 1 of this invention and the reference road reaction torque Troad.

In FIG. 3, the horizontal axis indicates the steering angle, and the vertical axis indicates the torque.

Figure 4:
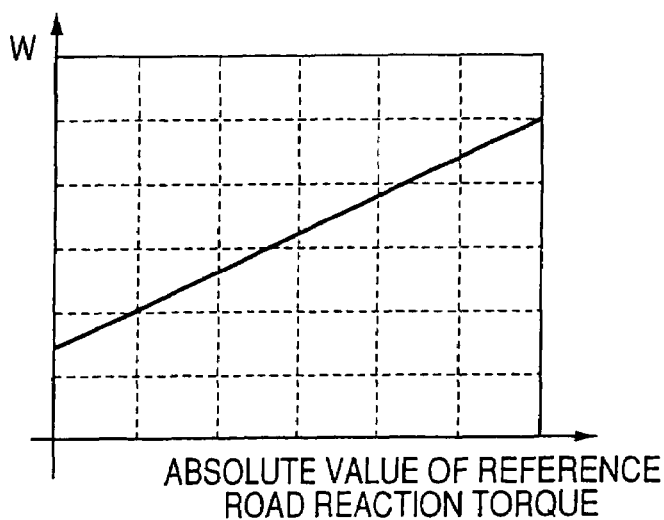
FIG. 4 is a view showing an example of a weighting factor W of the steering control apparatus according to embodiment 1 of this invention.

FIG. 4 is a view showing an example of a weighting factor W of the steering control apparatus according to embodiment 1 of this invention.

In FIG. 4, the horizontal axis indicates the absolute value of the reference road reaction torque, and the vertical axis indicates the weighting factor.

Figure 5:
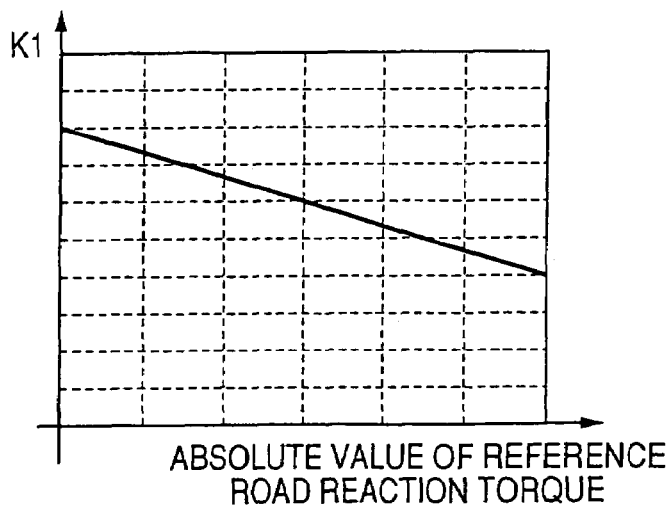
FIG. 5 is a view showing an example of a reaction torque gain K1 of the steering control apparatus according to embodiment 1 of this invention.

FIG. 5 is a view showing an example of a reaction torque gain K1 of the steering control apparatus according to embodiment 1 of this invention.

In FIG. 5, the horizontal axis indicates the absolute value of the reference road reaction torque, and the vertical axis indicates the reaction torque gain.

Figure 6:
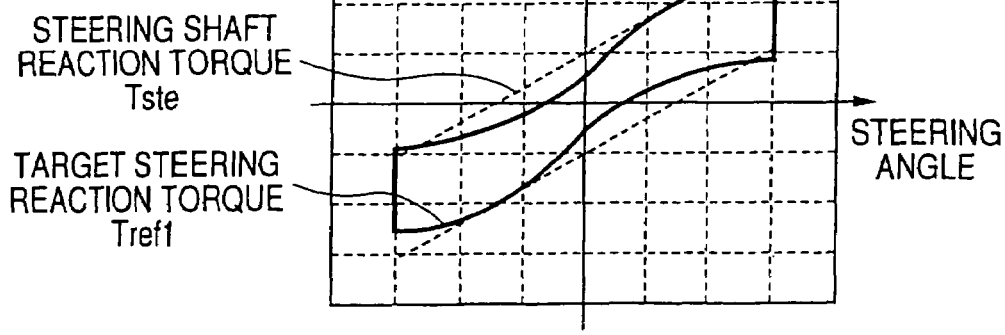
FIG. 6 is a view showing a steering shaft reaction torque of the steering control apparatus according to embodiment 1 of this invention and a target steering reaction torque.

FIG. 6 is a view showing the steering shaft reaction torque of the steering control apparatus according to embodiment 1 of this invention and the target steering reaction torque.

In FIG. 6, the horizontal axis indicates the steering angle, and the vertical axis indicates the torque.

Figure 7:
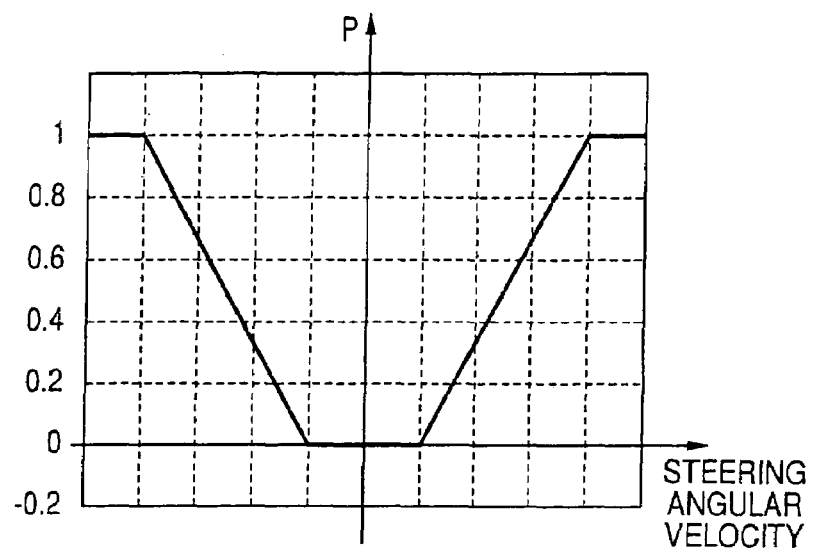
FIG. 7 is a view showing an example of a map of a weighting factor P of the steering control apparatus according to embodiment 1 of this invention.

FIG. 7 is a view showing an example of a map of a weighting factor P of the steering control apparatus according to embodiment 1 of this invention.

In FIG. 7, the horizontal axis indicates the steering angular velocity, and the vertical axis indicates the weighting factor P.

Figure 8:
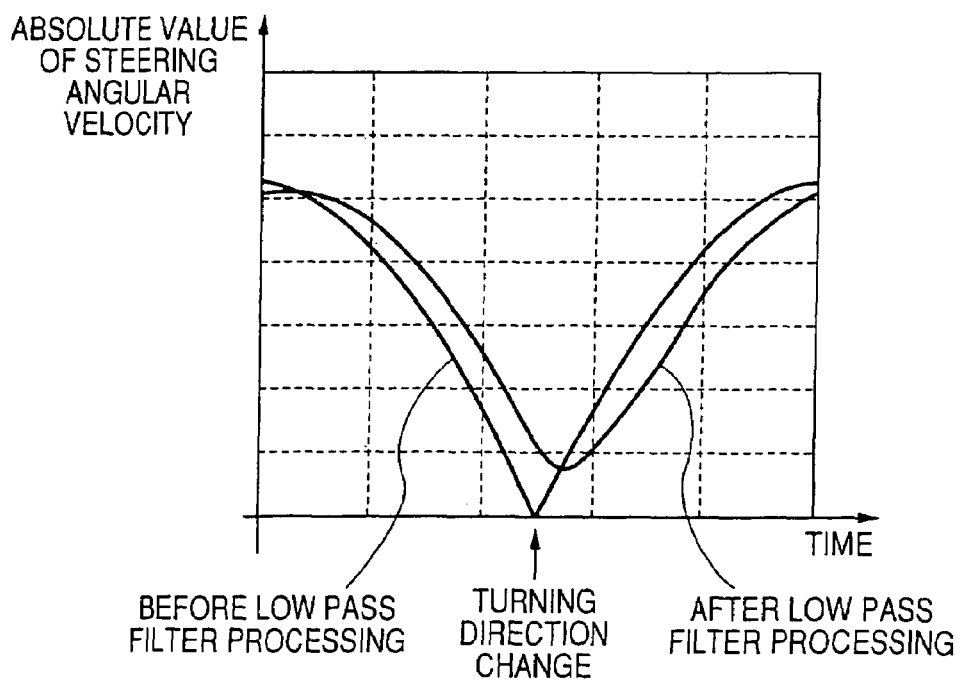
FIG. 8 is a view showing a difference in steering angular velocity, according to filter processing, of the steering control apparatus according to embodiment 1 of this invention.

FIG. 8 is a view showing a difference in the steering angular velocity, according to filter processing, of the steering control apparatus according to embodiment 1 of this invention.

In FIG. 8, the horizontal axis indicates the time, and the vertical axis indicates the absolute value of the steering angular velocity.

Next, the target steering reaction torque generation means will be described in sequence by use of the flowchart of FIG. 2.

First, the steering shaft reaction torque estimation means of step S1 of FIG. 2 will be described.

The steering shaft reaction torque is, the sum of the steering shaft converted value (reference road reaction torque Troad) of road surface reaction torque acting on the wheel at the time of turning the wheel and the steering shaft converted value Tfric of friction torque acting on the wheel turning mechanism 17. As an estimation method of the steering shaft reaction torque, a following method is used.

The wheel turning mechanism 17 of FIG. 1 corresponds to a case where a wheel is turned by only the output of an assist motor in a general electric power steering apparatus. When a steering angle motor current is Ima, a steering angle motor torque constant is Kma, inertia of the steering angle motor is Jma, a steering angle motor gear ratio (gear ratio from the steering angle motor 8 to the steering shaft 10) is Gma, and steering shaft angular acceleration is $d2\theta/dt2$, with respect to the steering shaft reaction torque Tste, mechanically, a relation of expression 1 is established.

$$Tste = Gma \cdot Kma \cdot Ima - Gma^2 \cdot Jma \cdot d^2\theta/dt^2 \quad \text{(expression 1)}$$

The steering shaft angular acceleration $d^2\theta/dt^2$ is obtained by doubly differentiating the output value of the wheel steering angle detection means 11. When the inertia term of the motor is taken into consideration, the steering shaft reaction torque at the early steering time can be estimated with high accuracy.

Especially, in the case where the inertia of the motor is small, and the influence of the motor inertia can be neglected, the road surface reaction torque Tste can be estimated by expression 2.

$$Tste = Gma \cdot Kma \cdot Ima \quad \text{(expression 2)}$$

In the case where noise is included in Tste, the noise is removed by a low-pass filter having such a cut-off frequency that a delay does not become a problem.

Next, the reference road reaction torque estimation means of step S2 of FIG. 2 will be described.

The reference road reaction torque Troad is the reaction torque acting on the wheel at the time of turning the wheel, and here, it is made the reaction torque subjected to steering shaft conversion. The sum of the reference road reaction torque Troad and the friction torque Tfric acting on the wheel turning mechanism 17 corresponds to the steering shaft reaction torque. That is, as shown in FIG. 3, the reference road reaction torque is the reaction torque passing through the center of a hysteresis width in the steering shaft reaction torque.

In the reference road reaction torque estimation means, a filter processing method used in JP-A-2001-122146 is used. That is, the reference road reaction torque is estimated by causing the estimated steering shaft reaction torque to pass through the low-pass filter. Although the cut-off frequency of the low-pass filter is 0.05 to 1 Hz, it may be changed according to the steering speed and the vehicle speed.

The target steering reaction torque is set from the steering shaft reaction torque Tste estimated in this way and the estimated reference road reaction torque Troad. The hysteresis width and the slope of the target steering reaction torque can be respectively adjusted by using the steering shaft reaction torque and the reference road reaction torque.

Next, step S3 and step S4 of FIG. 2 will be described.

Here, the reaction torque gain K1 and the weighting factor W varying by the steering wheel angle, the wheel steering angle, the reference road reaction torque Troad and the like are used, weighting of the steering shaft reaction torque Tste and the reference road reaction torque Troad is performed by using an expression 3, and the target steering reaction torque Tref1 is calculated.

$$Tref1 = K1 \cdot \{W \cdot Tste + (1-W) \cdot Troad\}$$

$$W \geq 0 \quad \text{(expression 3)}$$

For example, from FIG. 3, the reference road reaction torque Troad and the steering shaft reaction torque Tste are expressed by a following expression.

$$Troad = Kalign \cdot \theta$$

$$Tste = Kalign \cdot \theta + sign(d\theta/dt) \cdot Tfric$$

Here, $\theta$ denotes a steering shaft angle, $d\theta/dt$ denotes a steering shaft angular velocity, $sign(d\theta/dt)$ denotes a sign of the steering shaft angular velocity, and Kalign denotes a slope of the reference road reaction torque Troad with respect to the steering shaft angle $\theta$ or the steering shaft reaction torque Tste. Besides, $sign(d\theta/dt) \cdot Tfric$ corresponds to a hysteresis width of the steering shaft reaction torque. When a substitution is made into the expression 3, the target steering reaction torque Tref1 is expressed by a following expression.

$$Tref1 = k1 \cdot Kalign \cdot \theta + W \cdot K1 \cdot sign(d\theta/dt) \cdot Tfric$$

That is, the slope of the target steering reaction torque Tref1 is adjusted with K1, and the hysteresis width of the target steering reaction torque Tref1 can be adjusted with W·K1.

For example, when the weighting factor W is made small in an area where the reference road reaction torque Troad is small, the hysteresis width can be made small, and an on-center feeling becomes strong. Besides, a quick steering feeling with little influence of friction can be obtained.

Further, the reaction torque gain K1 is made large in an area where the reference road reaction torque Troad is small, and the reaction torque gain K1 is made small in an area where the reference road reaction torque Troad is large, so that the on-center feeling is intensified, and the steering reaction torque is made small in an area where the steering angle is large, and a power assist effect is obtained.

FIG. 6 shows an example of the steering shaft reaction torque and the target steering reaction torque obtained by using the expression 3.

Besides, since the steering shaft reaction torque and the reference road reaction torque are changed by the vehicle speed, the reaction torque gain K1 and the weighting factor W are changed according to the vehicle speed. FIG. 4 and FIG. 5 show examples of the weighting factor W and the reaction torque gain K1. The horizontal axis takes the absolute value of the reference road reaction torque, since the steering in both directions is taken into consideration.

Next, step S5 and step S6 of FIG. 2 will be described.

When the steering reaction torque with the hysteresis between turning increase and turning back is tried to be controlled by a reaction torque motor, at the time when the steering wheel is tried to be kept or when the steering wheel is lightly held, the steering reaction torque causes hunting in the hysteresis by the fine steering, and the steering feeling is degraded.

Figure 13:
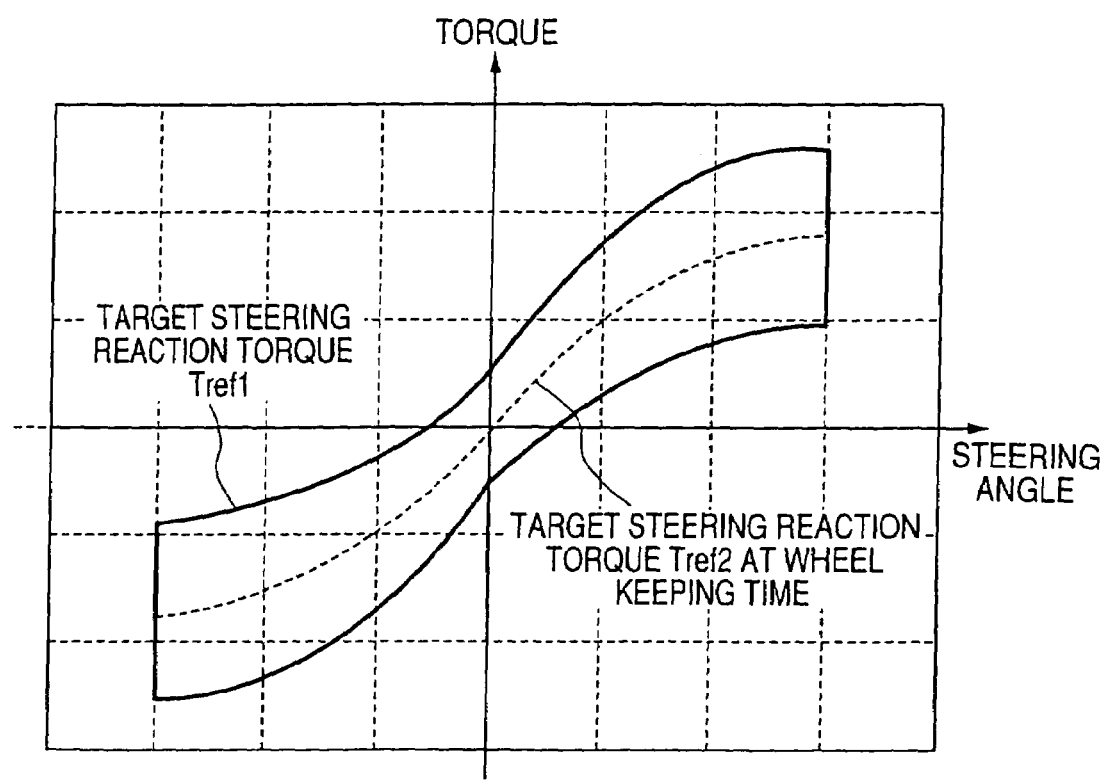
FIG. 13 is a view showing a relation between a target steering reaction torque of the steering control apparatus according to embodiment 1 of this invention and a target steering reaction torque during holding a steering wheel.

Then, the hysteresis width is made to be changed by the steering speed of the steering wheel. As shown in FIG. 13, a target steering reaction torque Tref2 at the wheel keeping time, which passes through the center of the hysteresis width of Tref1, is calculated by using an expression 4.

$$Tref2 = K1 \cdot Troad \quad \text{(expression 4)}$$

Further, a new target steering reaction torque is calculated by using an expression 5.

$$Tref3 = P \cdot Tref1 + (1-P) \cdot Tref2$$

$$0 \leq P \leq 1 \quad \text{(expression 5)}$$

P denotes a weight approaching 0 when the steering angular velocity is small. In the case where the noise of the angular velocity of the steering wheel is large, or in the case where the influence at the time of the fine steering is made small, P is obtained from a value obtained by performing a low pass filter processing on the steering angular velocity. FIG. 7 shows an example of a map of the weighting factor P.

Besides, P may be obtained from a value obtained by performing the low pass filter processing on the absolute value of the steering angular speed. When the turning direction of the steering wheel is changed, the angular velocity of the steering wheel becomes 0 instantaneously, however, it does not become 0 when the low pass filter processing is performed on the absolute value. That is, the turning direction change operation is not judged to be the wheel keeping. FIG. 8 shows the difference of the steering angular velocity according to the filter processing.

According to embodiment 1, at steps S1 and S2, the target steering reaction torque is generated from the steering shaft reaction torque Tste and the-reference road reaction torque Troad, so that the vehicle behavior at the time of running can be transmitted to the driver, and the natural feeling can be obtained.

Further, since the hysteresis width and the slope of the target steering reaction torque can be respectively adjusted, the suitable target steering reaction torque to improve the steering feeling can be easily set.

Besides, since both the steering shaft reaction torque and the reference road reaction torque are estimated and obtained, the number of matching steps can be decreased. Besides, since both the steering shaft reaction torque and the reference road reaction torque are estimated and obtained, the stable steering reaction torque can be set according to the change (change of the road surface friction μ and the like) in the running state.

Besides, at steps S3 and S4, the suitable target steering reaction torque to improve the steering feeling can be easily set.

Besides, the steering reaction torque with the excellent steering feeling can be obtained according to the vehicle speed change.

Further, at steps S5 and S6, when the steering wheel speed is small, the target steering reaction torque with a small hysteresis width is generated, so that the hunting oscillation occurring in the hysteresis width at the wheel keeping time is suppressed, and the steering feeling can be improved.

EMBODIMENT 2

Figure 9:
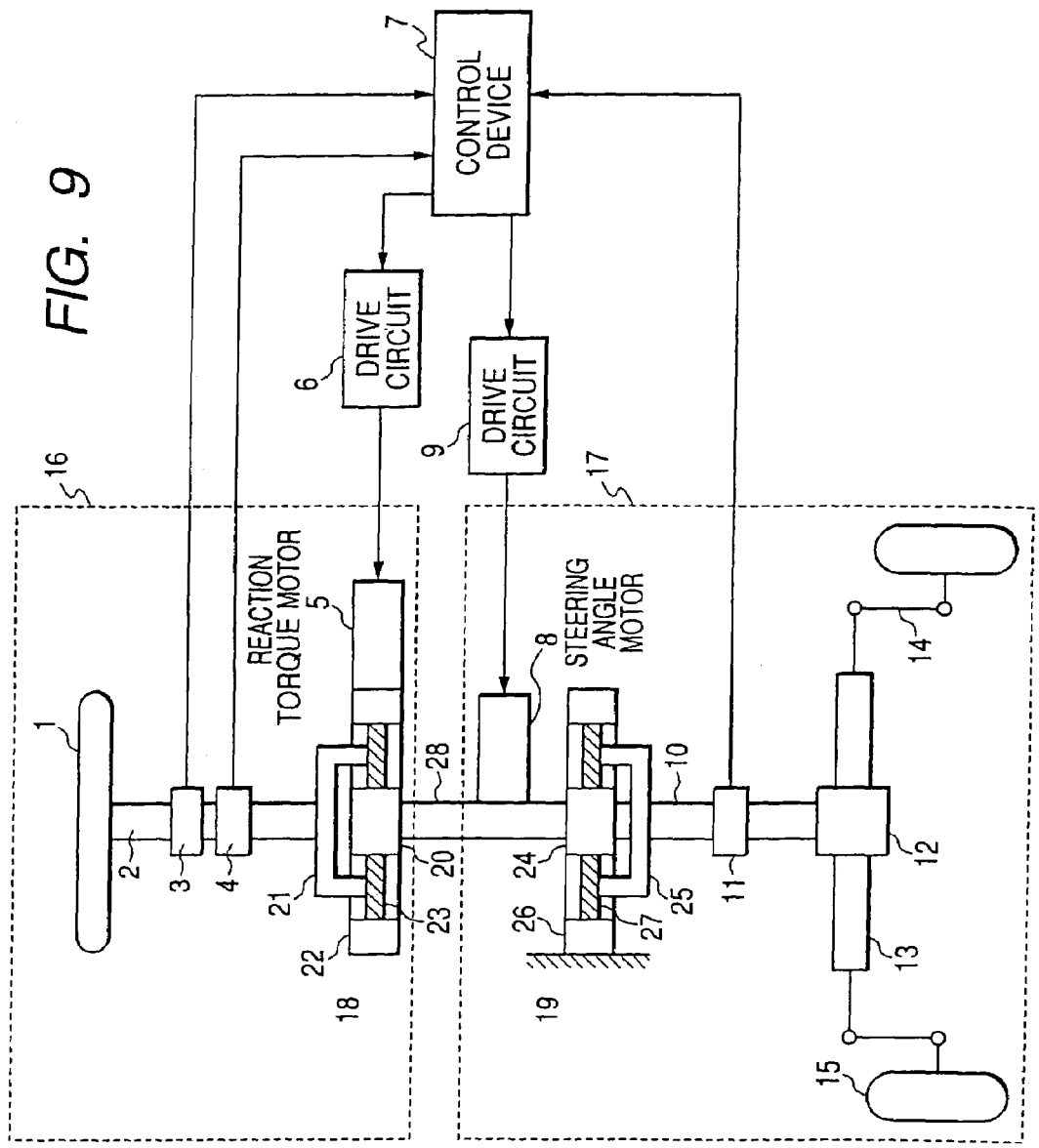
FIG. 9 is a view showing an outline of a structure of a steering control apparatus according to embodiment 2 of this invention.

FIG. 9 is a view showing an outline of a structure of a steering control apparatus according to embodiment 2 of this invention.

As compared with the steering control apparatus of FIG. 1 in which the steering mechanism 16 by which the driver operates the steering wheel 1 is not mechanically coupled to the wheel turning mechanism 17 which rotates the wheel 15, in FIG. 9, a steering mechanism 16 and a wheel turning mechanism 17 for turning a wheel 15 are mechanically coupled to each other through a planetary gear mechanism 18 and a planetary gear mechanism 19.

A steering wheel shaft 2 is coupled to a carrier 21 of the planetary gear mechanism 18. A reaction torque motor 5 is connected to a ring gear 22 of the planetary gear mechanism 18 through a gear, and controls the rotation of the ring gear. A steering shaft 10 is coupled to a carrier 25 of the planetary gear mechanism 19. A sun gear 20 of the planetary gear mechanism 18 and a sun gear 24 of the planetary gear mechanism 19 are coupled to each other through a shaft 28, and a steering angle motor 8 is connected to the shaft 28 through a gear. A ring gear 26 of the planetary gear mechanism 19 is fixed so that it can not be rotated. A planetary gear 23 of the planetary gear mechanism 18, and a planetary gear 27 of the planetary gear mechanism 19 are also shown in the drawing.

In FIG. 9, the steering angle motor 8 controls a wheel steering angle (angle of the steering shaft 10). The planetary gear mechanism 18 functions as a differential mechanism, generates an angle difference between the steering angle of the steering wheel and the steering angle of the wheel, and controls the steering reaction torque applied to the steering wheel 1 by the reaction torque motor 5.

An angle of the sun gear 20 of the planetary gear mechanism 18 is made θ1s, an angle of the carrier 21 is made θ1c, and an angle of the ring gear 22 is made θ1r. A gear ratio of the sun gear 20 to the carrier 21 at the time when the rotation of the ring gear 22 is fixed is made G1s.

$$\theta 1s = G1s \cdot \theta 1c \quad \text{(expression 6)}$$

A gear ratio of the ring gear 22 to the carrier 21 at the time when the rotation of the sun gear 20 is fixed is made G1r.

$$\theta 1r = G1r \cdot \theta 1c \quad \text{(expression 7)}$$

From characteristics of the planetary gear mechanism, in the case where the torque T1c is inputted to the carrier 21, the output torque T1s at the sun gear 20 and the output torque T1r at the ring gear 22 has a relation of $$T1s/G1r = T1c/(G1s \cdot G1r) = T1r/G1s \quad \text{(expression 8)}$$

Since the input torque T1c of the carrier 21 is equal to the steering reaction torque Tsens detected by steering reaction torque detection means 4, the output torque T1s from the sun gear 20 is obtained by an expression 9.

$$T1s = T1c/G1s = Tsens/G1s \quad \text{(expression 9)}$$

An angle of the sun gear 24 of the planetary gear mechanism 19 is made θ2s, and an angle of the carrier 25 is made θ2c. When a gear ratio of the sun gear 24 to the carrier 25 is made G2s, $$\theta 2s = \theta 1s = G2s \cdot \theta 2c \quad \text{(expression 10)}$$

When a current of the steering angle motor is Ima, a steering angle motor torque constant is Kma, an inertia of the steering angle motor is Jma, a steering angle motor gear ratio (gear ratio from the steering angle motor 8 to the shaft 28) is Gma, and a steering shaft angular acceleration is $d^2\theta 2c/dt^2$, a dynamical expression is obtained as follows:

$$Gma^2 \cdot Jma \cdot d^2\theta 1s/dt^2 = T1s + Gma \cdot Kma \cdot Ima - Tste/G2s \quad \text{(expression 11)}$$

When this is expressed in steering shaft angle, a following expression is obtained.

$$Gma^2 \cdot G2s \cdot Jma \cdot d^2\theta 2c/dt^2 = Tsens/G1s + Gma \cdot Kma \cdot Ima - Tste/G2s \quad \text{(expression 12)}$$

Thus, the steering shaft reaction torque can be estimated from a following expression 13.

$$Tste = G2s \cdot Tsens/G1s + Gma \cdot G2s \cdot Kma \cdot Ima - Gma^2 \cdot G2s^2 \cdot Jma \cdot d^2\theta 2c/dt^2 \quad \text{(expression 13)}$$

The steering shaft angular acceleration $d^2\theta 2c/dt^2$ is obtained by doubly differentiating the output value of the wheel steering angle detection means 11.

In the case where the inertia of the motor is small, and the influence of the motor inertia can be neglected, the steering shaft reaction torque Tste can be estimated by a following expression.

$$Tste = G2s \cdot Tsens/G1s + Gma \cdot G2s \cdot Kma \cdot Ima \quad \text{(expression 14)}$$

In the case where noise is included in Tste, the noise is removed by a low-pass filter having such a cut-off frequency that the delay does not become a problem.

In the mechanism shown in FIG. 9, in order to estimate the steering shaft reaction torque, it is necessary to obtain a force acting on the shaft 28 from the steering mechanism 16, however, it becomes complicated to obtain the force when the inertia of the reaction torque motor, the output torque and the like are taken into consideration. However, by using the output Tsens of the steering reaction torque detection means 4 for detecting the steering reaction torque applied to the steering wheel, the force acting on the shaft 28 from the steering mechanism 16 can be obtained as a value gain times as large as Tsens.

Thus, the steering shaft reaction torque can be estimated from the detected steering reaction torque Tsens, the steering angle motor current Ima, and the steering shaft angular acceleration $d^2\theta 2c/dt^2$, the state amount necessary for the estimation can be made small, and the stable estimation is possible. A sensor is not required to be added from the structure of FIG. 9, and the cost can be reduced.

Besides, in order to estimate the steering shaft reaction torque it is not necessary to estimate the road surface friction coefficient μ and to judge the direction of friction, and the steering shaft reaction torque can be stably estimated.

Incidentally, also in a structure in which the steering wheel shaft 2 is coupled to the sun gear 20 of the planetary gear mechanism 18, the steering shaft 10 is coupled to the sun gear 24 of the planetary gear mechanism 19, and the carrier 21 of the planetary gear mechanism 18 is coupled to the carrier 25 of the planetary gear mechanism 19 through the shaft 28, or also in a structure in which a differential gear mechanism such as a harmonic drive speed reduction mechanism is used instead of the planetary gear mechanism 18, when the input/output relation of the torque is used, the steering shaft reaction torque can be estimated from the output result Tsens of the steering reaction torque detection means 4 for detecting the steering reaction torque, the steering angle motor current Ima, and the steering shaft angular acceleration $d^2\theta 2c/dt^2$.

Besides, since the planetary gear mechanism 19 merely functions as a speed reduction mechanism, another speed reduction mechanism may be used instead of the planetary gear mechanism.

According to embodiment 2, also in the structure of FIG. 9, the steering shaft reaction torque can be estimated, the state amount necessary for the estimation can be decreased, and the stable estimation is possible. A sensor is also not required to be added from the structure of FIG. 9, and the cost can be reduced.

Besides, similarly to embodiment 1, the estimated steering shaft reaction torque Tste is used, and the flowchart of FIG. 2 of embodiment 1 is performed, so that the target steering reaction torque is generated. By that, in the target steering reaction torque generation means, effects similar to embodiment 1 can be obtained.

This invention can also be applied to a conventional electric power steering control apparatus, or a steering control apparatus including a transmission ratio variable mechanism for causing a transmission ratio of a wheel turning angle to a steering angle of a steering wheel to be variable and an electric power steering apparatus. Hereinafter, an embodiment in which the invention is applied to an electric power steering control apparatus will be described.

EMBODIMENT 3

Figure 10:
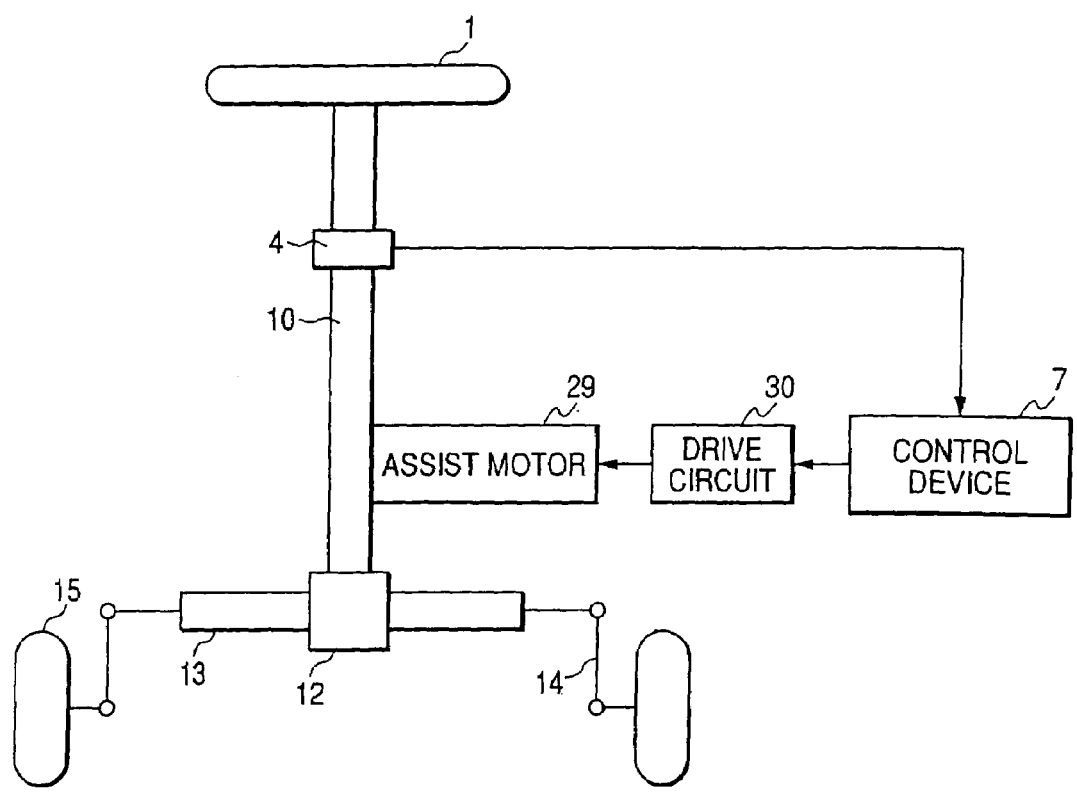
FIG. 10 is a view showing an outline of a structure of a steering control apparatus according to embodiment 3 of this invention.

FIG. 10 is a structural view showing an outline of a structure of a steering apparatus according to embodiment 3 of this invention. In the steering apparatus in which when a driver operates a steering wheel 1, a rotation angle of the steering wheel 1 is converted into a wheel steering angle of a wheel 15 through a steering shaft 10, a pinion gear 12, a rack 13, and a knuckle arm 14, the electric power steering control apparatus calculates a motor current target value of an assist motor 29 by a control device 7 on the basis of the output of steering reaction torque detection means 4 for detecting a steering reaction torque in the case where the driver steers. A drive circuit 30 controls a drive current so that the target current set by the control device 7 is applied to the assist motor current.

In a conventional electric power steering control apparatus, an assist torque is set on the basis of the output of the steering reaction torque detection means 4, and the motor current target value is calculated so that the set assist torque is generated. On the other hand, in this invention, the target steering reaction torque Tref is set, and the assist motor current target value is calculated so that the steering reaction torque Tsens is coincident with the target steering reaction torque Tref, and the target steering reaction torque Tref is set by using the estimated steering shaft reaction torque Tste and the estimated reference road reaction torque.

Figure 11:
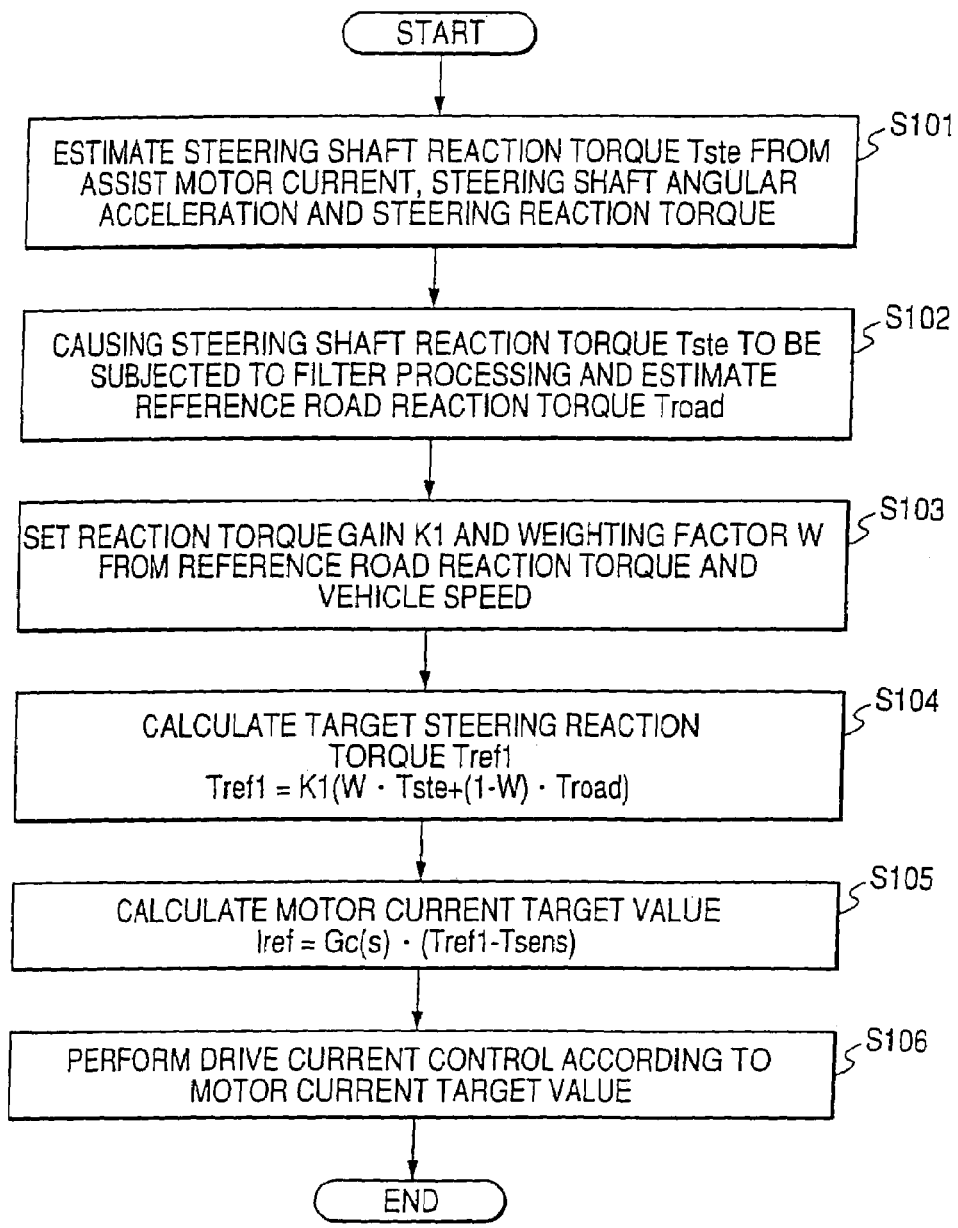
FIG. 11 is a flowchart of embodiment 3 of this invention.

FIG. 11 is a flowchart of embodiment 3.

Steering shaft reaction torque estimation means of step S101 will be described. When an assist motor current is Ima, an assist motor torque constant is Kma, an inertia of the assist motor is Jma, an assist motor gear ratio (gear ratio from the assist motor 29 to the steering shaft 10) is Gma, a steering shaft angular acceleration is $d^2\theta/dt^2$, and an output of the steering reaction torque detection means 4 is Tsens, the steering shaft reaction torque Tste can be estimated from a following expression.

$$T\text{ste}=T\text{sens}+G\text{ma}\cdot K\text{ma}\cdot I\text{ma}-G\text{ma}^2\cdot J\text{ma}\cdot d^2\theta/dt^2 \quad \text{(expression 15)}$$

At steps S102, S103 and S104, similarly to embodiment 1, the estimated steering shaft reaction torque Tste is used, and the flowchart of FIG. 2 is performed, so that the target steering reaction torque is generated. By that, in the target steering reaction torque generation means, effects similar to embodiment 1 can be obtained.

At step S105, the assist motor current target value Iref is calculated so that the steering reaction torque Tsens to the steering of the driver is controlled to become the target steering reaction torque Tref1. For example, an expression 16 is computed and the current target value Iref is calculated.

Here, (s.) denotes a Laplace operator, and for example, PID control is adopted as Gc(s).

$$I\text{ref}=Gc(s)\cdot(T\text{ref1}-T\text{sens}) \quad \text{(expression 16)}$$

At step S106, drive current control of the drive circuit is performed so that the target current Iref set at step S105 is applied to the assist motor current.

According to this embodiment 3, in the electric power steering control apparatus, the hysteresis width and the slope of the steering reaction torque can be respectively adjusted, and the steering feeling is improved.

EMBODIMENT 4

An example of a steering control apparatus including a transmission ratio variable mechanism for causing a transmission ratio of a wheel turning angle to a steering angle of a steering wheel to be variable, and an electric power steering apparatus will be described below.

Figure 12:
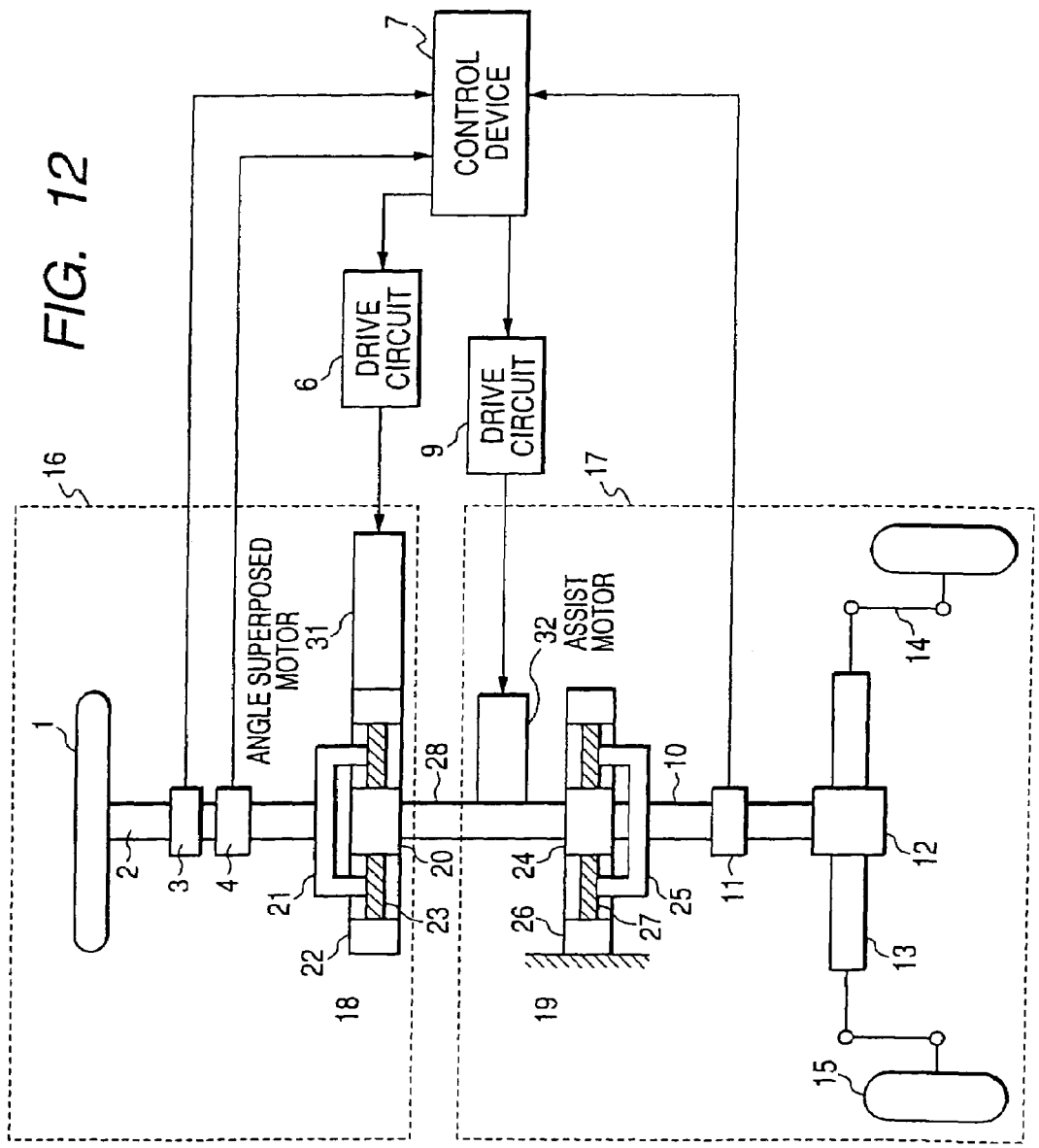
FIG. 12 is a view showing an outline of a structure of a steering control apparatus according to embodiment 4 of this invention.

FIG. 12 shows a steering control apparatus including a transmission ratio variable mechanism and an electric power steering apparatus. Although FIG. 12 shows the same mechanism as FIG. 9, the reaction torque motor 5 of FIG. 9 operates as an angle superposed motor 31 of the transmission ratio variable mechanism, and the steering angle motor 8 of FIG. 9 operates as an assist motor 32 of the electric power steering apparatus.

An angle of a sun gear 20 of a planetary gear mechanism 18 is made θ1s, an angle of a carrier 21 is made θ1c, and an angle of a ring gear 22 is made θ1r. Besides, an angle of a steering shaft 10 is made θ2c. By using a differential mechanism of a planetary gear mechanism 18, a relational expression of an expression 16 is established among the angle θ1c of the carrier 21, the angle θ1r of the ring gear 22, and the angle θ2c of the steering shaft 10.

$$\theta 2c = \theta 1c - \theta 1r/G1r \quad \text{(expression 17)}$$

That is, the angle θ1r of the ring gear is controlled by the angle superposed motor 31 according to the steering of the steering wheel, so that the transmission ratio of the wheel turning angle to the steering angle of the steering wheel can be made variable.

The procedure of practice is similar to the flowchart of FIG. 11 of embodiment 3.

At step S103 of FIG. 11, a reaction torque gain K1 and a weighting factor W may be changed according to the angle of the steering wheel, the wheel steering angle, the transmission ratio of the wheel steering angle to the angle of the steering wheel, and the other vehicle state amount.

For example, the reaction torque gain K1 and the weighting factor W are set in view of the transmission ratio, so that the change of the steering reaction torque of the driver at the time when the transmission ratio is changed can be suppressed.

According to embodiment 4, in the electric power steering control apparatus, the hysteresis width and the slope of the steering reaction torque can be respectively adjusted, and the steering feeling is improved. Further, the steering reaction torque is set in view of the transmission ratio, so that the change of the steering reaction torque of the driver at the time when the transmission ratio is changed can be suppressed.

INDUSTRIAL APPLICABILITY

The present invention is appropriately applied to the steering control apparatus of an automobile or the like.

The invention claimed is:

1. A steering control apparatus comprising;
target steering reaction torque generation means for generating a target steering reaction torque as a target value of a steering reaction torque to be applied to a steering wheel, and for controlling steering reaction torque to coincide with the target steering reaction torque, wherein the target steering reaction torque generation means includes steering shaft reaction torque estimation means for estimating a steering shaft reaction torque, and reference road reaction torque estimation means for estimating a reference road reaction torque, the target steering reaction torque generation means using the steering shaft reaction torque estimated by the steering shaft reaction torque estimation means and the reference road reaction torque estimated by the reference road reaction torque estimation means to set the target steering reaction torque.

2. The steering control apparatus as set forth in claim 1, wherein the steering shaft reaction torque and the reference road reaction torque are weighted and are used for setting of the target steering reaction torque.

3. The steering control apparatus as set forth in claim 2, wherein a coefficient used for weighting of the steering shaft reaction torque and the reference road reaction torque is changed according to speed of a vehicle incorporating the steering control apparatus.

4. The steering control apparatus as set forth in claim 1, wherein the target steering reaction torque set by the target steering reaction torque generation means and the target steering reaction torque set by the reference road reaction torque during holding of a steering wheel connected to the steering control apparatus are used for weighting, according to steering angular velocity, to set a new target steering reaction torque.

5. The steering control apparatus as set forth in claim 1, including a steering wheel shaft coupled to a steering wheel and a wheel turning mechanism for turning a wheel coupled to each other through a differential gear mechanism, wherein the steering shaft reaction torque estimation means uses a motor current of a steering angle motor for controlling wheel steering angle, steering reaction torque, and steering shaft angular acceleration to estimate the steering shaft reaction torque.

* * * * *